F. KRABBE.
PROCESS OF MAKING STEEL FACED ARTICLES.
APPLICATION FILED JAN. 10, 1906.
907,374.
Patented Dec. 22, 1908.
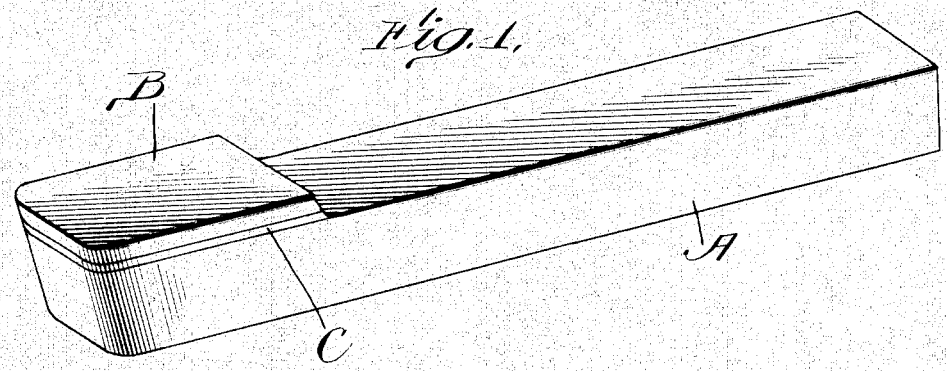
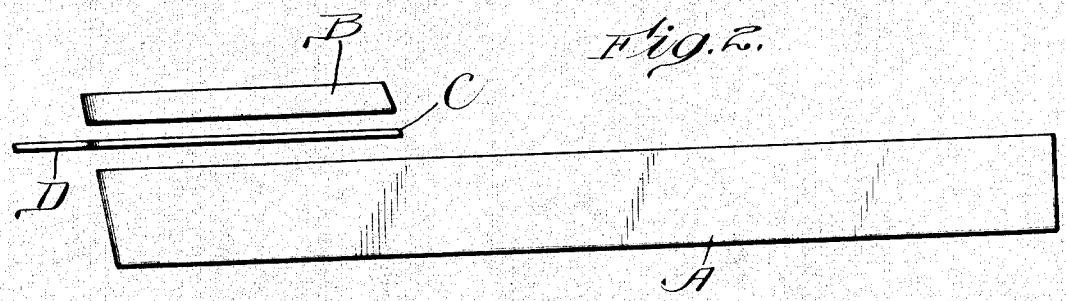
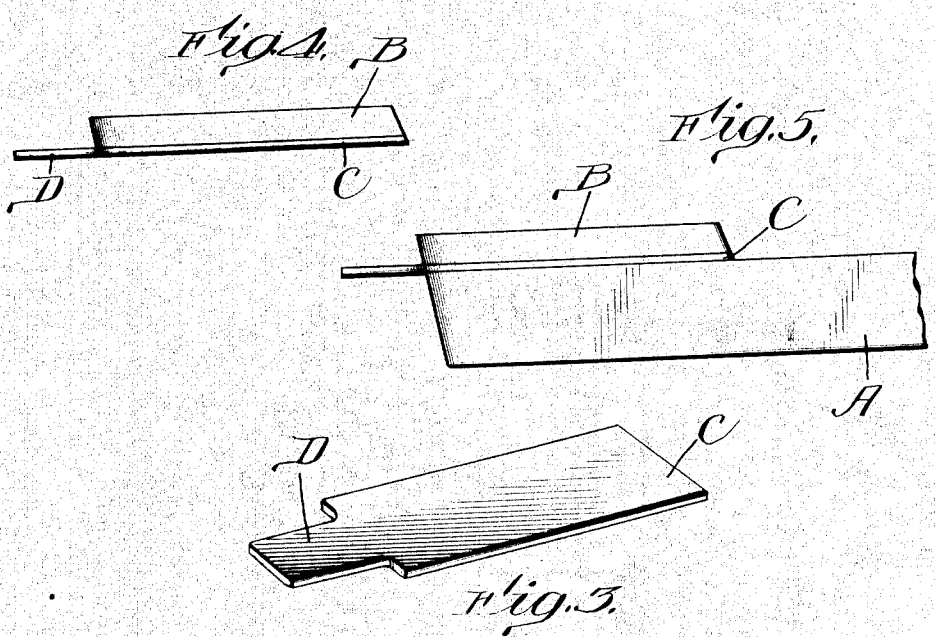
Witnesses:
Robert N. Weir
H. V. Domarus
Inventor
Fredrik Krabbe
By Raymond & Barnett
Attys.

UNITED STATES PATENT OFFICE.

FREDRIK KRABBE, OF CHICAGO, ILLINOIS.

PROCESS OF MAKING STEEL-FACED ARTICLES.

No. 907,374.          Specification of Letters Patent.        Patented Dec. 22, 1908.

Application filed January 10, 1906. Serial No. 295,436.

*To all whom it may concern:*

Be it known that I, FREDRIK KRABBE, a citizen of the United States, residing at Chicago, in the county of Cook and State of Illinois, have invented certain new and useful Improvements in Processes of Making Steel-Faced Articles, of which the following is a specification.

This invention relates to improvements in tools utilizing what is commonly known as high speed, tool steel, and has for its object to provide a method by which the body of the tool may be made of relatively cheap, soft steel which, at the same time, may be tough in its structure, and uniting to this body a facing of high speed, tool steel, which provides the cutting edge. Heretofore it has been necessary to make tools of this character, for example, the tools used in turning steel rolls, entirely out of high speed, tool steel. This has been attended with several disadvantages, for instance, the high cost of this sort of steel, the difficulty in forging the same, and its liability to break under the strains incident to use. There are several kinds of this high speed, tool steel or, as it is sometimes called, air hardening or self hardening steel, some of which varieties are made by secret processes. They are all, however, very much alike in their characteristics and are all relatively expensive. The principal characteristic of steel of this character is that it will cut other steel moving at a very high speed without melting or being destroyed, as would be the case with the commoner grades of steel.

Heretofore it has been thought impossible to weld or otherwise unite high speed, tool steels with the common grades of softer steel and, as a matter of fact, it is impossible to weld them together directly.

The object of the present invention is to provide means whereby a piece of this high speed, tool steel or air hardening steel may be united to a body of ordinary and less expensive steel, which may, however, be of tougher character, with special reference to the manufacture of tools wherein it is desirable that the portion of the tool having the cutting edge shall be of high speed, tool steel and the body portion of steel of a lower grade, although such process may be utilized in other connections where it is desired to unite steels having these different characteristics. In accomplishing this object I form the tool of three parts, first, a body portion of cheaper steel, which is preferably tough so as to resist the strains put upon the tool in use; second, a portion of high speed, tool steel, of any of the customary sorts in use to-day, to carry the cutting edge, and third, a plate or insert of iron placed between these elements; the three parts being then welded together in any ordinary way.

Figure 1 is a perspective view of a common form of lathe tool; Fig. 2 shows in elevation the three constituent parts of the tool before being united; Fig. 3 is a perspective view of a suitable iron plate for use in the manufacture of this tool; and Figs. 4 and 5 show successive steps in the manufacture of the tool.

In the several figures of the drawings like reference characters indicate the same parts throughout.

In these drawings A is the body portion of the tool, which will ordinarily be of relatively soft, tough steel, B is the edge-carrying or working portion composed of high speed steel or air hardening steel, as it is sometimes called, C is an iron plate designed to be placed between these pieces of steel. This plate C may be provided with a projecting handle portion D for convenience in handling the tool in the welding process.

Preferably I first weld the iron insert or plate C to the hard steel piece B, this being readily accomplished by heating the piece B and the iron plate C according to well known blacksmith practice, and welding them together by pressure, usually by hammering and working. I then have the composite piece shown in Fig. 4. I next suitably heat the steel portion A and the composite piece B, C and then weld the body portion A to the iron plate C in any usual manner.

Of course, the relative contour of the parts A, B and C will vary according to the article being manufactured, and the term plate as used in this description has no technical meaning, but is merely a convenient term for describing one or the other of the component parts of the tool.

While the above outlined method of proceedings has been found to be convenient, it is evident that any other desired method might be employed. For instance, the iron plate C may be first united to the body portion A, if convenient or desirable, and the hard steel plate B could then be welded to the face of the plate C. Any convenient method of welding may be employed, as, for instance, electric welding, or the ordinary process wherein the parts to be united are heated in a forge, or with suitable appliances the two pieces of steel may be assembled with the interposed piece of iron and the three pieces sufficiently and simultaneously heated, whereby the iron will be welded to each piece of steel at the same time. The precise order of steps is not necessarily of any importance.

If the plate C be provided with the projecting handle portion D, this portion may be conveniently cut off or otherwise removed before final grinding and finishing of the tool.

Obviously this process may be employed in the manufacture of other kinds of tools than those enumerated above or in the manufacture of any articles in which it is desired to unite high speed, tool steel or air hardening steel to a body of steel of different character wherein ordinary welding processes would be ineffective.

I claim:

1. The process of uniting a facing of high speed, tool steel to a body portion of relatively soft steel, which consists in interposing between said facing and said body an iron plate and welding said steel elements to the plate.

2. The process of making a tool having a soft steel body and a facing of high speed, tool steel, which consists in interposing between said facing and said body an iron plate, heating said elements to an ordinary welding temperature not sufficient to melt them, and uniting the same in an integral structure by the application of suitable pressure while so heated.

3. A tool consisting of a body part of relatively soft, tough steel, an iron plate upon the body part, and a facing of high speed, tool steel provided with a cutting edge disposed over the iron plate, the iron plate and facing united with the body part in an integral structure.

4. A tool consisting of a body part of relatively soft, tough steel, a facing of high speed, tool steel provided with a cutting edge, and an iron plate inserted between the body and the facing, these three components being united together by welding.

5. The process of making a tool having a soft steel body and a high-speed, tool steel facing, which consists in heating one of said steel elements and an iron plate to an ordinary welding temperature not sufficient to melt either of the parts, welding said plate and said steel element together by hammering or pressure, then heating the iron plate so welded so as to bring it to the ordinary welding temperature not sufficient to melt, heating the other steel element to a like temperature, and welding said steel element and the iron together in a similar manner.

FREDRIK KRABBE.

Witnesses:
O. R. BARNETT,
H. L. PECK.